United States Patent  [15] 3,681,373
Adams et al.  [45] Aug. 1, 1972

[54] XANTHENYL-AMINES

[72] Inventors: Stewart Sanders Adams, Redhill; Bernard John Armitage, Beeston; Bernard Vincent Heathcote, Lowdham; Norman William Bristow, Woolaton, all of England

[73] Assignee: Boots Pure Drug Company Limited, Nottingham, England

[22] Filed: March 17, 1970

[21] Appl. No.: 20,426

[30] Foreign Application Priority Data

March 27, 1969 Great Britain..........16,179/69

[52] U.S. Cl.................260/308 R, 260/309, 424/269, 424/273

[51] Int. Cl................................C07d 99/04
[58] Field of Search.....................260/308 R

[56] References Cited

UNITED STATES PATENTS 3,290,313  12/1966  Cusic et al...................260/335

Primary Examiner—Alton D. Rollins
Attorney—Gordon W. Hueschen

[57] ABSTRACT

4-9′-Xanthenylamino-4H-1,2,4-triazoles and 1-9′-xanthenylaminoimidazoles, useful as antisecretory agents.

6 Claims, No Drawings

XANTHENYL-AMINES

This invention relates to new derivatives of xanthen which have utility in the treatment of peptic ulceration.

According to one feature of the invention there are provided compounds of general formula I

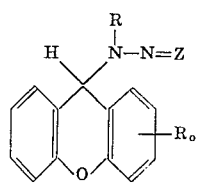

I in which R is hydrogen, lower alkyl, or lower alkanoyl; $R_o$ is hydrogen, halogen, lower alkyl, lower alkoxy or hydroxy; —N = Z is selected from

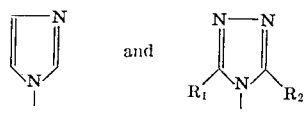

and $R_1$ and $R_2$ are hydrogen or lower alkyl.

The compounds of general formula I may be prepared by reacting the appropriate xanthydrol or an ester thereof with a compound of general formula II
HN(R) — N = Z ... II Exact reaction conditions will be readily apparent to those skilled in the art from inherent knowledge, the prior art literature and the examples appended to this specification.

A preferred compound of general formula I is 4-9'-xanthenylamino-4H-1,2,4-triazole. Other typical compounds of general formula I are the following:

4-1'-fluoro-9'-xanthenylamino-4H-1,2,4-triazole
4-2'-fluoro-9'-xanthenylamino-4H-1,2,4-triazole
4-1'-methyl-9'-xanthenylamino-4H-1,2,4-triazole
4-1'-methoxy-9'-xanthenylamino-4H-1,2,4-triazole
4-2'-methoxy-9'-xanthenylamino-4H-1,2,4-triazole
4-1'-chloro-9'-xanthenylamino-4H-1,2,4-triazole
4-2'-chloro-9'-xanthenylamino-4H-1,2,4-triazole
4-2'-hydroxy-9'-xanthenylamino-4H-1,2,4-triazole
3,5-dimethyl-4-9'-xanthenylamino-4H-1,2,4-triazole
4-acet-N-9'-xanthenylamido-4H-1,2,4-triazole
4-(N-methyl-N-9-xanthenyl)amino-4H-1,2,4-triazole
1-9'-xanthenylaminomidazole We have found that compounds of general formula I are antisecretory agents, with a specific activity against gastric secretion and without any anticholinergic activity. In particular the compounds reduce or inhibit the secretion of gastric acid in animals; they are therefore useful for reducing or inhibiting gastric secretion (particularly the secretion of gastric acid) and for the treatment of peptic ulceration. (The term "peptic ulceration" is used in its broad sense, as is conventional in the art, to include both gastric ulceration and duodenal ulceration). The anti-secretory activity of the compounds has been demonstrated in the stimulated, pylorus ligated rat.

The dosage rates of compounds of general formula I vary according to the values of R, $R_o$ and —N = Z, but normally fall within the range ⅓ – 60 mg. of compound of general formula I per kilogram of body weight of subject per day; in the cases of the more active compounds, dosage rates of 0.5 – 8 mg./kg./day are acceptable.

The compounds of general formula I may be administered orally, rectally or parenterally, preferably orally, the optimum dose rate varying with the activity of the compounds. A preferred dosage rate for oral administration is of the order of 25 mg. – 4 g. daily, preferably 35 mg. – 600 mg. daily, optionally in divided doses.

According to a further feature of the invention there are provided therapeutic compositions which comprise a compound of general formula I in association with pharmaceutical excipients known for the production of compositions suitable for oral, rectal or parenteral administration. The compositions of the invention preferably contain 0.1 – 90 percent by weight of a compound of general formula I.

Compositions for oral administration are the preferred compositions of the invention, and these are the known pharmaceutical forms for such administration, such asfor example tablets, capsules, syrups and aqueous and oily suspensions. The excipients used in the preparation of these compositions are the excipients known in the pharmacist's art.

Preferred compositions are tablets wherein a compound of general formula I is mixed with a conventional inert diluent such as lactose in the presence of disintegrating agents e.g. maize starch and lubricating agents e.g. magnesium stearate. Such tablets may, if desired, be provided with enteric coatings by known methods, for example by the use of cellulose acetate phthalate. Similarly capsules, for example hard or soft gelatin capsules, containing a compound of general formula I, with or without other excipients, may be prepared by conventional means and, if desired, provided with enteric coatings in known manner. The tablets and capsules may conveniently each contain 10 –500 mg. of a compound of general formula I. Other, but less preferred, compositions for oral administration include for example aqueous suspensions containing a compound of general formula I in aqueous media in the presence of a non-toxic suspending agent e.g. sodium carboxymethylcellulose and dispersing agents, and oily suspensions containing a compound of general formula I in a vegetable oil for example arachis oil.

Compositions of the invention suitable for rectal administration are the known pharmaceutical forms for such administration, such as for example suppositories with cocoa butter or polyethylene glycol bases.

Compositions of the invention suitable for parenteral administration are the known pharmaceutical forms for such administration, for example sterile suspensions in aqueous and oily media or sterile solutions in propylene glycol.

In the compositions of the invention the compounds of general formula I may if desired be associated with other compatible pharmacologically active ingredients. For example antacids and acid absorbents such as aluminum hydroxide and magnesium trisilicate may be included in compositions for oral administration to give an immediate antacid effect. Other pharmacologically active agents which may be associated with the compounds of general formula I include compounds active on the central nervous system, including short and long acting sedatives such as the barbiturates and methaqualone, antihistaminic and/or antiemetic agents such as cyclizine and diphenhydramine, and anticholinergic agents such as atropine.

Milk and milk solids are valuable in the treatment of peptic ulcer, and the compositions of the invention include liquid and solid compositions based on milk and milk solids.

According to another aspect of the invention there is provided a method of reducing gastric secretion, especially the secretion of gastric acid, which method comprises administering to a subject an anti-secretory effective amount of a compound of general formula I, preferably orally.

According to another aspect of the invention there is provided a method of treating peptic ulcer which comprises administering to a subject an anti-secretory effective amount of a compound of general formula I, preferably orally.

The following non-limitative examples illustrate the invention.

EXAMPLE 1

A solution of xanthydrol (1.98 g.) in 1:1 by volume ethanol/acetic acid (6 mls.) was added to a solution of 4-amino-4H-1,2,4-triazole (0.84 g.) in acetic acid (2.5 ml.). After 24 hours at room temperature the reaction mixture was cooled to 0° C., filtered and the residue recrystallized from dimethylformamide/toluene to give 4-9'-xanthenylamino-4H-1,2,4-triazole, m.p. 231°–232.5° C.

In a similar manner, using the appropriately substituted 4-amino-4H-1,2,4-triazole in place of 4-amino-4H-1,2,4-triazole there were obtained: 3,5-dimethyl-4-9'-xanthenylamino-4H-1,2,4-triazole, m.p. 242°–245° C. (from dimethylformamide; a solvate containing 0.5 mole D.M.F.) 4-acet-N-9'-xanthenylamido-4H-1,2,4-triazole, m.p. 225°–226° C.

EXAMPLE 2

A solution of 4-amino-1-methyl-4H-1,2,4-triazolium toluene-p-sulphonate (11.5 g.) in water (13 ml.) was treated with a solution of sodium hydroxide (2.6 g.) in water (2 ml.). After 3 hours at 70° C., the solution (containing 4-methylamino-4H-1,2,4-triazole) was cooled, diluted with ethanol (85 ml.) and acetic acid (40 ml.), and treated with xanthydrol (7 g.). After 3 days, the solution was poured on saturated aqueous sodium bicarbonate (2 liters) and the product isolated with ether. Crystallization from ethyl acetate gave 4-(N-methyl-N-9-xanthenyl)amino-4H-1,2,4-triazole, m.p. 149°–151° C.

EXAMPLE 3

A solution of imidazole (6.8 g.) and potassium hydroxide (11.2 g.) in water (70 ml.) was heated to 70° C. and hydroxylamine-O-sulphonic acid (11.3 g.) in water (10 ml.) was added. After 40 minutes on the steam bath, the reaction mixture was cooled, filtered and rotary-evaporated to dryness at 15 mm. Ethanol (4 × 100 ml.) was added and evaporated off. The residue was dissolved in ethanol (100 ml.), the solution filtered and evaporated; fractional distillation using a 1 cm. Vigreux column gave crude 1-aminoimidazole, b.p. 85° C./ 0.05 mm.

This material (0.45 g.) and 9-xanthenyl acetate (1.3 g.) in benzene (30 ml.) were refluxed for 1 hour and left at 25° C. overnight. Addition of aqueous sodium bicarbonate gave a precipitate which was recrystallized from benzene (10 ml.) and dried for 1.5 hours at 100° C./ 4 mm. to yield 1-9'-xanthenylaminoimidazole, m.p. 166°–167° C.

[Satisfactory elemental analyses were obtained for the compounds of general formula I prepared in the above Examples 1–3.]

EXAMPLE 4

In the preparation of tablets, mixtures of the following type may be tabletted in conventional manner:

| | |
|---|---|
| Compound of general formula I | 10–90% |
| Lactose | 0–80% |
| Maize starch | 5–10% |
| Magnesium stearate | ca.1% |
| Microcrystalline cellulose | 0–90% |
| | (by weight) |

EXAMPLE 5

The following mixture was dry granulated and compressed in a tabletting machine to give tablets containing 50 mg. of active ingredient:

| | |
|---|---|
| 4-9'-xanthenylamino-4H-1,2,4-triazole | 25% |
| Maize starch | 10% |
| Lactose | 20% |
| Magnesium stearate | 1% |
| Microcrystalline cellulose | to 100% by weight |

EXAMPLE 6

In the preparation of enteric coated tablets, tablets prepared as described in Example 5 were coated with sanderac varnish and then coated with cellulose acetate phthalate using a solution of 20 percent cellulose acetate phthalate and 3 percent diethyl phthalate in a mixture of equal parts of industrial alcohol and acetone.

EXAMPLE 7

The following mixture was dry granulated and compressed in a tabletting machine to give tablets containing 50 mg. of active ingredients:

| | |
|---|---|
| 4-9'-xanthenylamino-4H-1,2,4-triazole | 10 g. |
| Lactose | 10 g. |
| Maize starch | 5 g. |

EXAMPLE 8

In the preparation of enteric coated tablets, the tablets described in Example 7 were given a thin coat of shellac followed by 20 coats of cellulose acetate phthalate.

EXAMPLE 9

In the preparation of capsules, a mixture of the ingredients described in Example 7 was encapsulated in hard gelatin capsules. Enteric coating was applied by conventional dipping in cellulose acetate phthalate.

EXAMPLE 10

The following mixture was compressed into tablets in a conventional manner:

| | |
|---|---|
| 4-9'-xanthenylamino-4H-1,2,4-triazole | 25% |
| Sodium bicarbonate | 75% |
| Peppermint oil | q.s. |

EXAMPLE 11

A mixture of equal parts by weight of 4-9'-xanthenylamino-4H-1,2,4-triazole and lactose was encapsulated in hard gelatin capsules, each capsule containing 50 mg. of the triazole.

EXAMPLE 12

In the preparation of enteric coated capsules, the capsules of Example 11 were coated with cellulose acetate phthalate in the conventional manner.

EXAMPLE 13

Suppositories weighing 1 g. and containing 50 mg. of 4-9'-xanthenylamino-4H-1,2,4-triazole were prepared in conventional manner using a base consisting of

| | |
|---|---|
| Polyethylene glycol 4000 | 33% |
| Polyethylene glycol 6000 | 47% |
| Water | 20% |

EXAMPLE 14

A solution for parenteral administration was prepared comprising 4-9'-xanthenylamino-4H-1,2,4-triazole in propylene glycol, 100 mg./2 ml., sterilized by filtration.

Compositions similar to those described in Examples 4–14 were also prepared containing other compounds of general formula I previously described in place of 4-9'-xanthenylamino-4H-1,2,4-triazole.

We claim:
1. A compound of the formula

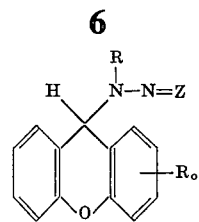

in which
R is hydrogen, lower alkyl or lower alkanoyl;
$R_o$ is hydrogen, halogen, lower alkyl, lower alkoxy or hydroxy; and
—N = Z is

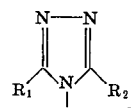

wherein $R_1$ and $R_2$ are hydrogen or lower alkyl.

2. A compound as claimed in claim 1 in which $R_o$ is hydrogen.
3. 4-9'-Xanthenylamino-4H-1,2,4-triazole.
4. The compound in accordance with claim 1 which is 3,5-dimethyl-4-9'-xanthenylamino-4H-1,2,4-triazole.
5. The compound in accordance with claim 1 which is 4-acet-N-9'-xanthenylamido-4H-1,2,4-triazole.
6. The compound in accordance with claim 1 which is 4-(N-methyl-N-9-xanthenyl)amino-4H-1,2,4-triazole.

* * * * *